(12) United States Patent
Squires

(10) Patent No.: US 7,815,717 B1
(45) Date of Patent: Oct. 19, 2010

(54) METHOD AND APPARATUS FOR RENEWING GAS-ENTRY FACES OF A PANEL FOR GAS AND GRANULAR MATERIAL CONTACTING

(76) Inventor: Arthur M. Squires, P.O. Box 10098, Blacksburg, VA (US) 24062

( * ) Notice: Subject to any disclaimer, the term of this patent is extended or adjusted under 35 U.S.C. 154(b) by 1137 days.

(21) Appl. No.: 11/482,922

(22) Filed: Jul. 7, 2006

Related U.S. Application Data

(60) Provisional application No. 60/698,982, filed on Jul. 14, 2005.

(51) Int. Cl.
*B01D 46/30* (2006.01)
(52) U.S. Cl. .............................. 95/108; 95/109; 95/110; 95/275; 55/474; 96/123; 96/150
(58) Field of Classification Search .................... 95/274, 95/275, 276, 107, 108, 109, 110; 96/108, 96/121, 129, 123, 150; 55/282, 302, 474, 55/479, 517, 518; 165/104.18; 34/498, 168, 34/506, 174; 422/213, 216, 219
See application file for complete search history.

(56) References Cited

U.S. PATENT DOCUMENTS

| | | | | |
|---|---|---|---|---|
| 3,541,762 A | * | 11/1970 | Ramaswami et al. .......... | 95/275 |
| 3,982,326 A | * | 9/1976 | Squires .......................... | 34/443 |
| 4,004,350 A | * | 1/1977 | Squires .......................... | 34/506 |
| 4,145,280 A | * | 3/1979 | Middelbeek et al. ......... | 210/665 |
| 4,157,959 A | * | 6/1979 | Wen et al. .................... | 210/807 |
| 4,299,598 A | * | 11/1981 | Dutkiewicz ................... | 95/275 |
| 5,415,684 A | * | 5/1995 | Anderson ...................... | 95/109 |
| 6,783,572 B1 | * | 8/2004 | Squires .......................... | 95/274 |
| 2004/0226450 A1 | * | 11/2004 | Dai ............................... | 96/150 |

OTHER PUBLICATIONS

A. M. Squires; *Granular-bed filtration assisted by filter-cake formation: 4. Advanced designs for panel-bed filtration and gas treating*; Powder Technology, 155 (2005); Elsevier B.V.; pp. 74-84.

* cited by examiner

*Primary Examiner*—Duane Smith
*Assistant Examiner*—Minh-Chau Pham
(74) *Attorney, Agent, or Firm*—James Creighton Wray; Meera P. Narasimhan

(57) ABSTRACT

There is provided an improved method and apparatus for renewal of a plurality of faces across which gas enters a panel of a granular material. The panel is for contacting the gas and granular material with each other to effect physical or chemical treatment of at least one of them (for example, to filter dust from a gas or to remove a constituent from a gas by means of adsorption or absorption). In the panel, gas-entry faces are transversely disposed, upwardly spaced, and held in place by supporting members. These supporting members are subjected to a sharp motion in a direction toward the gas-entry faces, causing body movement of the granular material toward the faces, thereby causing moieties of granular material to fall away therefrom. Removal of these moieties and exposure of previously underlying granular material renew the faces. Flat-plate louvers are preferred supporting members.

10 Claims, 4 Drawing Sheets

METHOD AND APPARATUS FOR RENEWING GAS-ENTRY FACES OF A PANEL FOR GAS AND GRANULAR MATERIAL CONTACTING

This application claims the benefit of U.S. Provisional Application No. 60/698,982, filed Jul. 14, 2005, which is hereby incorporated by reference in its entirety.

FIELD OF THE INVENTION

The invention relates to the intimate contacting of a gas and a loose granular solid material for the purpose of chemically or physically treating one or both of the gaseous and solid substances, for example: to filter fine particulate matter ("dust") from the gas; to effect a chemical change in gas or solid; to remove a chemical constituent of the gas by absorption, adsorption, or chemical reaction; to heat a cold gas by contact with a hot solid. The invention also relates to the countercurrent contacting of a gas and a granular solid material.

BACKGROUND OF THE INVENTION

U.S. Pat. No. 6,783,326 (Aug. 31, 2004), which the instant application incorporates by reference, broadly discusses uses of a panel of granular material: for filtration of a dusty gas, assisted by an accumulation of deposits of dust (filter cakes) upon gas-entry faces of the panel; for countercurrent contacting of the granular material with a gas.

The referenced patent discloses means for renewing gas-entry faces of a panel of a granular material in which faces are transversely disposed, upwardly spaced, and held in place by supporting members. One means is to provide a surge flow of gas toward the faces (a "puffback"), which produces a body movement of the granular material toward the faces, thereby producing spills of moieties of the material from the faces and concomitantly exposing previously underlying material, thereby renewing the faces. Another means is to strike the panel with the blow of a hammer, the blow being directed either upward or downward. The blow also gives rise to a body movement of granular material toward gas-entry faces, producing spills of moieties of material therefrom.

These means are admirably effective in renewing gas-entry faces when a supporting member is a louver seen in vertical cross-section to comprise two segments: an outer segment sloping upward from its outer edge (e.g., sloping at an angle of 9° to horizontal) and an inner segment sloping upward toward the louver's inner edge at, preferably, an angle not less than ~45° to horizontal (where "outer" refers to the outside limit of the gas-entry side of the granular-bed panel, and "inner" refers to a location within the interior of the panel).

A disappointment, however, has been performance of these means when tested for renewal of gas-entry faces resting upon transversely disposed upwardly spaced flat-plate louvers. Following a puffback of flat-plate louvers (inclined upward from their outer edges at 9°), a narrow, sand-free region appears beneath each louver, extending to its upper, inner edge. A similar, sand-free region appears after subjecting flat-plate louvers to a sharp upward or downward motion; this region is even wider than the narrow sand-free region seen following puffback.

The appearance of this region is undesirable for two reasons. First, following gas-entry face renewal, granular material moves downward in a space between inner edges of support louvers and a panel's gas-exit side, the downward motion making good losses of granular material from the panel's gas-entry faces. If the panel is tall, at flat-plate louvers near its top, the downward motion pulls granular material away from part of gas-entry faces close by their inner edges. If the panel is employed for filtering dust from a gas, such pulling away of moieties of gas-entry-face material hurts filtration efficiency. Second, in an application requiring countercurrent contacting (i.e., an application requiring relatively wide flat-plate louvers), extension of a sand-free region to a louver's inner edge spoils the desired countercurrenticity of contacting in the granular material lying beneath this region.

Yet flat-plate louvers have important advantages over louvers comprising outer and inner segments, the latter sloping upward at 45°: flat-plate louvers afford significantly lower pressure drops and lower costs for fabrication.

SUMMARY OF THE INVENTION

A primary object of the invention is to provide an improved method and apparatus for renewing gas-entry faces of a panel of granular material in which the members supporting the faces are inexpensive flat-plate louvers.

Another object is to provide an improved method and apparatus for bringing a gas and a granular material into intimate contact to effect physical or chemical treatment of at least one of them, wherein an application of the method or apparatus entails lowered costs and lesser pressure loss of the gas.

Another object is to achieve countercurrenticity in the contacting of a gas and a granular material at low cost and low gas pressure loss.

Another object is to provide an improved filter for removing fine particulate matter ("dust") from a gas.

Another object is to provide an improved technique for periodically removing granular material adjacent to gas-entry faces of a panel-form gas-powder contactor.

The present invention relates to an improved method for renewal of a plurality of faces across which gas enters a panel of granular material for contacting the gas and the granular material with each other to effect physical or chemical treatment of at least one of them. The gas-entry faces are transversely disposed, upwardly spaced, and held in place by supporting members. The members are subjected to a sharp motion in a direction toward the gas-entry faces, this direction having a predominant horizontal component. The motion causes body movement of the granular material toward the faces, thereby causing moieties of granular material to fall away from the faces. Falling-away of the moieties and concomitant exposure of previously underlying granular material renews the faces.

Flat-plate louvers are preferred for usage as members supporting gas-entry faces. In one embodiment of the invention, the louvers are intermittently subjected to a sharp motion, thereby producing an intermittent body movement of the granular material toward the gas faces. This body movement and the flow of the gas in the opposite direction cause the contacting of the gas and granular material to be substantially countercurrent.

The present invention also relates to an improved apparatus for renewal of a plurality of gas-entry faces across which gas enters a panel of granular material for contacting the gas and the granular material with each other to effect physical or chemical treatment of at least one of them. The gas-entry faces are transversely disposed, upwardly spaced, and held in place by supporting members. Means are provided for subjecting the members to a sharp motion in a direction toward the gas-entry faces, this direction having a predominant horizontal component. The motion causes body movement of the granular material toward the faces, thereby causing moieties of granular material to fall away from the faces. Falling-away of the moieties and concomitant exposure of previously underlying granular material renews the faces. Flat-plate louvers are preferred for usage as members supporting gas-entry faces.

The means for subjecting the members to sharp motions includes a pressure chamber and a cylinder within the chamber that travels vertically. A first stop limits the cylinder's upward motion at a point where the cylinder divides the chamber into upper and lower regions. A substantially vertical rod depends from the cylinder. A substantially horizontal plate is situated beneath the cylinder and is capable of traveling vertically. The rod passes through a central opening in the plate and has a larger diameter below the plate than above it. A second stop limits the plate's downward motion. An electromagnetic device is supplied with electric current and holds the plate at a point where it forms the bottom closure of the lower region of the pressure chamber.

A hammer head is connected to the bottom of the rod. Beneath the hammer head lays a target. A blow of the hammer head against the target is translated by linkage rods and hinges below the target into a sideways thrust. This sideways thrust is applied to pads situated at central points on the gas discharge side of panels of granular material containing gas-entry faces. This thrust produces a sharp motion in the supporting members towards the gas-entry faces.

Gas at elevated pressure flows from a source through orifice means into the lower region of the pressure chamber, then into the upper region of the pressure chamber, and from there to the exterior of the chamber. The orifice means create an elevated pressure in the lower region of the pressure chamber a different elevated pressure in the upper region. The elevated pressure in the lower region is sufficiently higher than the elevated pressure in the upper region so as to hold the cylinder against the first stop.

The invention has a means for interrupting the electric current to the electromagnetic device, allowing the pressurized gas in the lower region of the pressure chamber to drive the plate downwards against the second stop. The gas in the lower region then discharges suddenly to the exterior of the chamber, allowing the pressurized gas in the upper region of the chamber to drive the cylinder sharply downward. This causes the hammer head to strike the target, which limits the downward motion of the cylinder.

The invention also has a means for renewing the electric current to the electromagnetic device. When the electric current is restored, the electromagnetic device lifts the plate upward, closing off the lower region of the pressure chamber. The flow of gas at an elevated pressure then restores the pressure levels in the upper and lower regions of the pressure chamber to their original levels. When the pressures return to normal, the cylinder is again lifted against the first stop.

The apparatus of the instant invention is suitable for renewing gas-entry surfaces in a panel of the filter trays, disclosed in utility application Ser. No. 10/303,739, now matured as U.S. Pat. No. 7,033,556 (Apr. 25, 2006) which the instant application incorporates by reference.

These and further other objects and features of the invention are apparent in the disclosure, which includes the above and ongoing written specification, with the claims and the drawings, and U.S. Pat. No. 6,783,326 and application Ser. No. 10/303,739 incorporated in the instant application by reference.

BRIEF DESCRIPTION OF THE DRAWINGS

The invention will be more particularly described in conjunction with the following drawings wherein.

Figure 5:
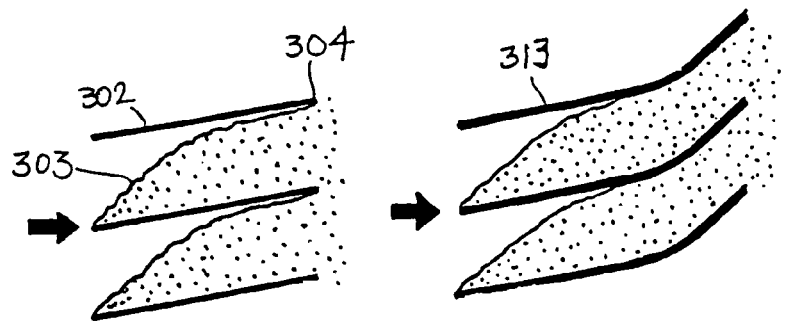

One diagram in FIG. 5 illustrates a performance flaw revealed by tests of a panel of flat-plate louvers intended for use in a panel filtering a dusty gas, the panel equipped for puffback or hammer-blow renewal of gas-entry faces; alongside, a second diagram illustrates a bent louver answering this flaw.

Figure 6:
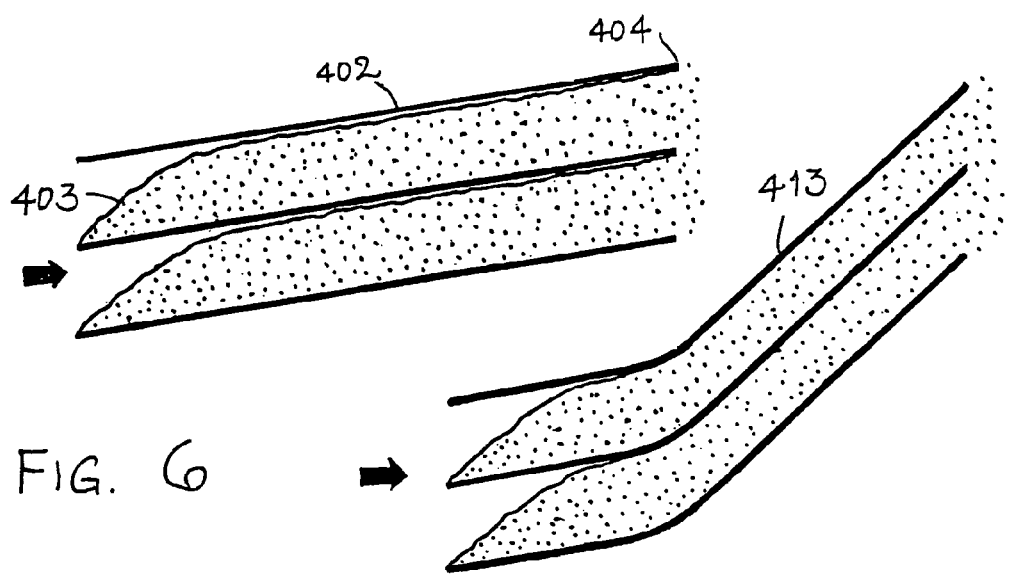

One diagram in FIG. 6 illustrates a performance flaw revealed by tests of a panel of flat-plate louvers intended for use in a panel effecting countercurrent contacting of a gas and the material, the panel equipped for puffback or hammer-blow renewal of gas-entry faces; alongside, a second diagram illustrates a bent louver answering this flaw.

Figure 1:
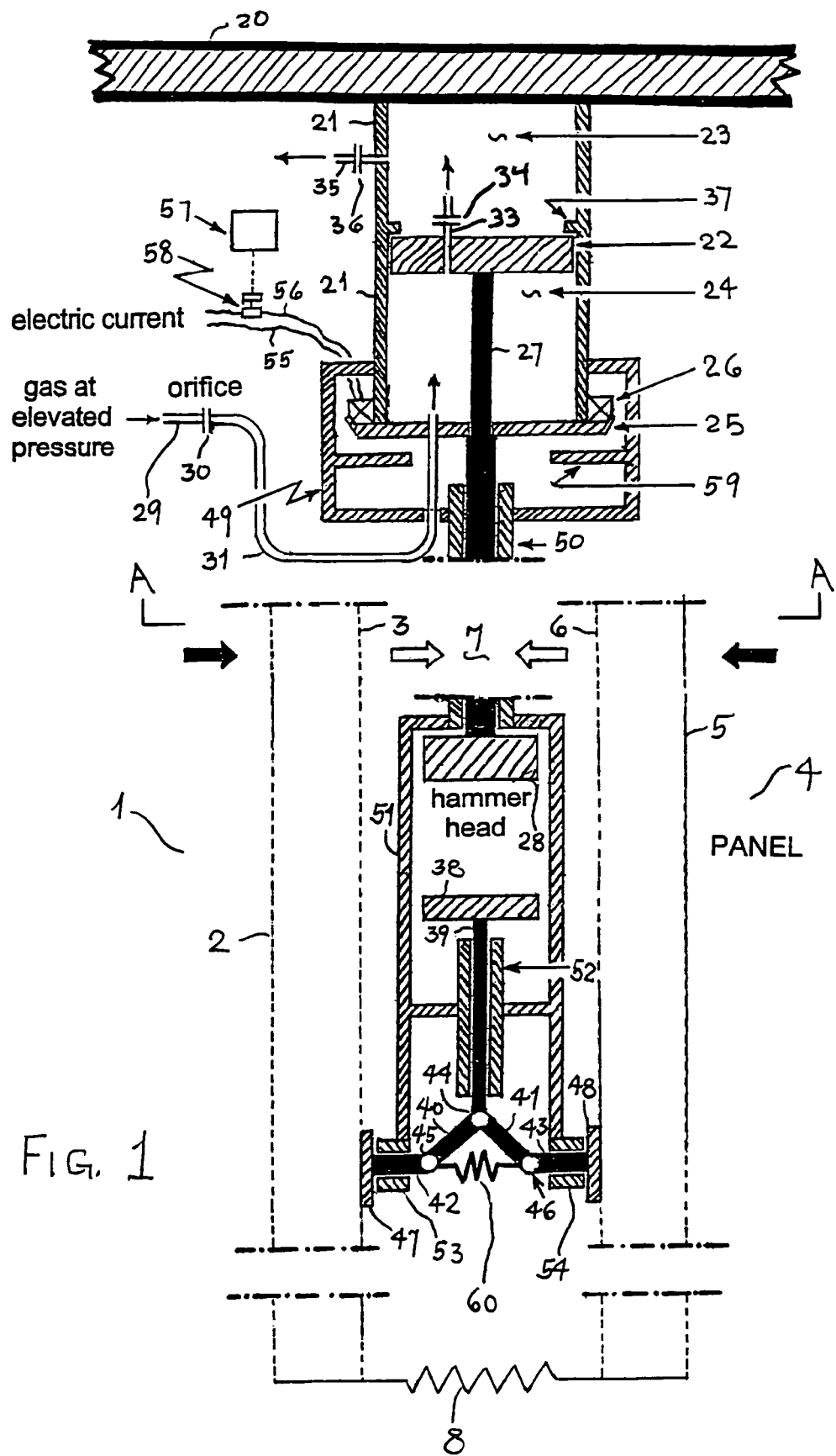
FIG. 1 is a vertical section illustrating an arrangement for imparting a sharp lateral motion to gas-entry-face support members of a panel of granular material.
Figure 7:
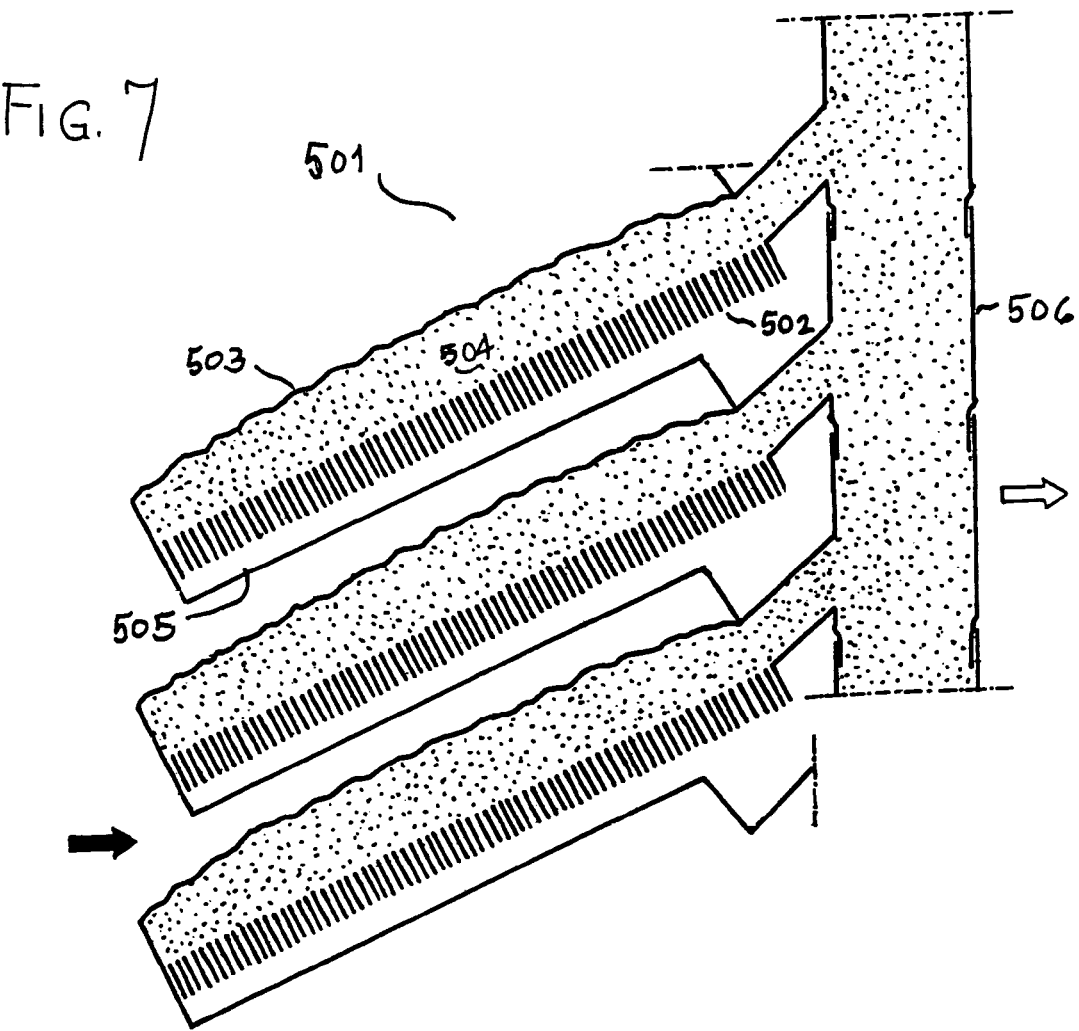

FIG. 7 is a vertical section illustrating a panel of filter trays for which application of the arrangement of FIG. 1 is suitable for purpose of gas-entry-face renewal.

DETAILED DESCRIPTION OF THE PREFERRED EMBODIMENTS

In the several figures, like reference numerals refer to like parts having like functions.

In FIG. 1, dashed lines provide a schematic representation (in vertical cross-section) of a tall, narrow granular material panel 1 presenting gas-entry faces at 2 and a porous gas-exit wall at 3. Similar dashed lines are a schematic representation of a second tall, narrow granular material panel 4 presenting gas-entry faces at 5 and a porous gas-exit wall at 6. Black arrows indicate flows of a gas entering the two panels and open arrows indicate gas flows leaving the panels. The latter flows enter a space 7 bounded vertically by the two panels. The space 7 is provided with a bottom closure 8, a portion of which is pleated, facilitating lateral motion of the two panels 1,4.

A beam 20 supports a pressure chamber 21, which a cylinder 22 divides into upper and lower regions 23, 24. The lower region 24 is bounded at the bottom by a plate 25 held in place by an electromagnet 26. The cylinder 22 centrally supports an upper vertical rod 27. The upper rod 27 passes through a central hole in the plate 25. The upper rod 27 has a diameter slightly larger below the plate 25 than above it. The upper rod 27 carries at its bottom end a hammer head 28. Gas at elevated pressure enters an inlet pipe 29 and flows through an orifice 30 into a delivery pipe 31, which carries the gas into the lower region 24. Gas enters the upper region 23 from the lower region 24 by flowing across the cylinder 22 through a conduit 33 via an orifice 34. Gas leaves the upper region 23, flowing to the outside of the chamber 21 through a conduit 35 via an orifice 36. The orifices 30, 34, 36 are at sizes such that a difference between gas pressures in the lower region 24 and the upper region 23 is sufficient to maintain the cylinder 22 in position against stops 37, while the pressure in the upper region 23 is significantly higher than a pressure outside of the chamber 21.

In the described condition of the aforesaid equipment items in FIG. 1, they are "cocked" to deliver a blow of the hammer head 28 upon a target 38. Such a blow drives a lower vertical rod 39 downward, and a linkage of its downward motion via linkage rods 40, 41, 42, 43 connected by hinges 44, 45, 46 delivers a sidewards thrust via pads 47, 48 upon the panels 1, 4. The pads 47, 48 are located at central positions on the porous gas-exit walls 3, 6. An upper frame 49 supports an upper vertical guide cylinder 50, which maintains strict verticality of the downward motion of the upper rod 27. The upper vertical guide cylinder 50 supports a lower frame 51, which in turn supports a lower vertical guide cylinder 52 and horizontal guide cylinders 53, 54. The lower vertical guide cylinder 52 maintains strict verticality of the downward motion of lower rod 39, while horizontal guide cylinders 53, 54 ensure strict horizontality of the sidewards thrust that the linkage rods 42, 43 exert upon the pads 47, 48.

Electric current reaches the electromagnet 26 via wires 55, 56. A sequence of events causes the hammer head 28 to deliver a blow upon the target 38 when a switch control 57 opens an electricity switch 58, interrupting the flow of electricity to the electromagnet 26. Pressure in the lower region 24 drives the plate 25 downward against the stops 59. The downward motion of the plate 25 has two effects: the motion forces the upper rod 27 downward and releases gas from the lower region 24 to the outside of the pressure chamber 21. Lowering of the pressure in the lower region 24 creates a pressure difference between the upper region 23 and lower region 24, the larger pressure present in the former region. This pressure difference increases the downward velocity of the cylinder 22. A blow of the hammer head 28 upon the target 38 stops the downward motion of the cylinder 22. Shortly after the blow is struck, the switch control 57 closes the electricity switch 58, commencing a new flow of electricity to the electromagnet 26, which lifts the plate 25 into its former position, closing the lower region 24. The action of a spring 60 serves to restore the panels 1, 4 to their original positions. Gas flow from the inlet pipe 29 (never interrupted) gradually restores the earlier pressure levels in the upper and lower regions 23, 24, and the equipment is "cocked" to deliver another hammer blow when operation of the panels 1, 4 requires it.

Figure 2:
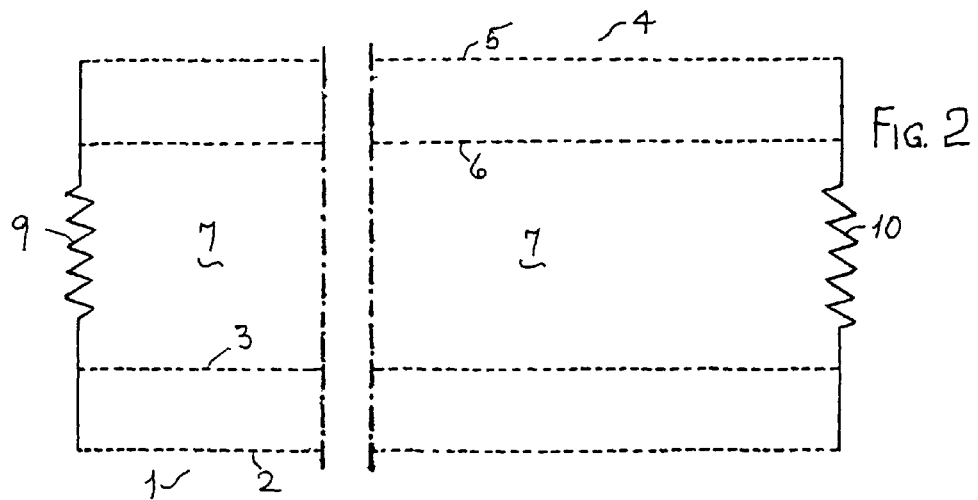
FIG. 2 is a horizontal section of the arrangement of FIG. 1.

FIG. 2 depicts schematically the horizontal cross-section A-A in FIG. 1. Side-closures 9, 10, like the bottom closure 8 seen in FIG. 1, have pleated portions facilitating lateral motion of the two panels 1,4.

Figure 3:
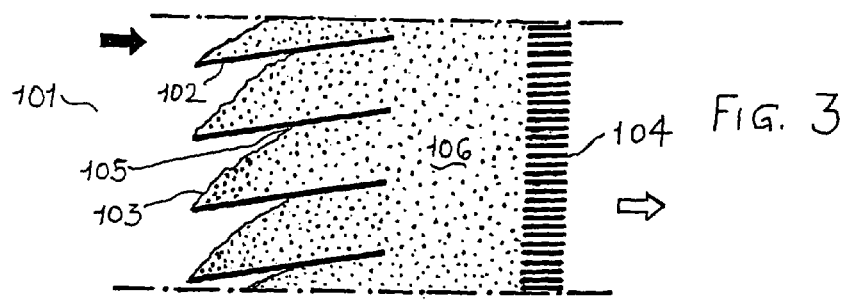
FIG. 3 is a vertical section illustrating a portion of a preferred design of a panel of granular material for use in filtering a dusty gas.

FIG. 3 is a schematic vertical cross-sectional drawing of a segment of a panel 101 employing supporting members in the form of flat-plate louvers 102, the preferred form for practice of the invention. A sidewards thrust upon the panel 101, such as the arrangement of FIG. 1 is capable of creating, causes granular material in the panel 101 to move en masse toward the louvers 102, thereby causing moieties of the material to fall away from gas-entry surfaces 103, renewing the surfaces. The panel of FIG. 3 is suitable for filtering a dusty gas, the filtration performance being assisted by an accumulation of filter cakes upon the gas-entry surfaces 103. Granular material is supported on the panel's gas-exit side by closely-spaced horizontal louvers 104. The vertical space between the neighboring horizontal louvers 104 can be a few times greater than substantially the smallest particle in the granular material. The space should be not greater than about one-sixth the width of one of the louvers 104.

Note that an inner edge 105 of the gas-entry face 103 does not extend to the inner edge of a superjacent support louver. At the inner edge 105 location seen in FIG. 3, a downward motion of granular material in a space 106, making good losses of material from the gas-entry surfaces 103 following a sidewards thrust upon the louvers 102, does not pull away material from gas-entry surfaces near the top of a tall panel, causing such pulled-away material to enter the space 106.

The space 106 communicates with an overhead supply of granular material in a manner to be seen by consulting U.S. Pat. No. 6,783,326, incorporated in the instant application by reference.

Figure 4:
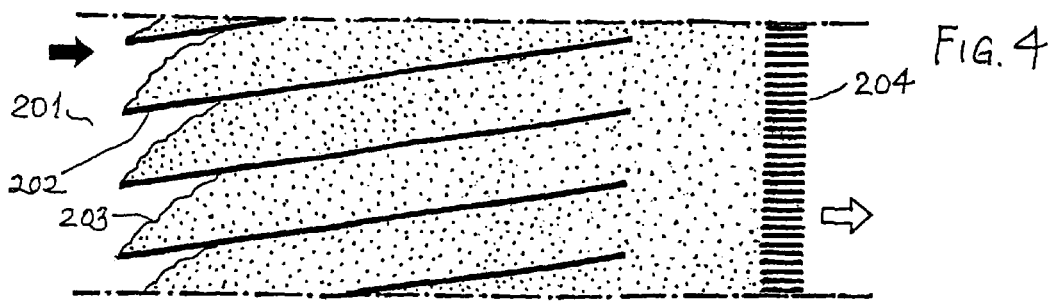
FIG. 4 is a vertical section illustrating a portion of a preferred design of a panel of granular material for effecting countercurrent contacting of a gas and the material.

FIG. 4 is a schematic vertical cross-sectional drawing of a segment of a panel 201 employing supporting members in the form of flat-plate louvers 202. The panel of FIG. 4 is suitable for achieving countercurrent contacting of a gas and a granular material, through periodic action of a sidewards thrust upon the panel 201 causing body movement of the material toward gas-entry faces 203. Granular material is supported on the panel's gas-exit side by closely-spaced horizontal louvers 204.

The left-hand drawing in FIG. 5 is a fragmentary vertical cross-section of flat-plate louvers 302, similar to the louvers 102 seen in FIG. 3. The drawing illustrates a flaw in the performance of a panel employing flat-plate louvers when either puffback or a vertical hammer blow is employed for renewal of gas-entry faces 303. A face is seen to extend all the way to a rear edge 304 of a superjacent louver 302, so creating an empty space, narrow in the vertical direction, between the face and the superjacent louver 302. The presence of such a narrow space is undesirable in a tall panel for filtration of a dusty gas, because of the danger that the downward motion of granular material inner from the rear edge 304 will pull material away from faces near the top of the panel. The right-hand drawing in FIG. 5 illustrates a louver design 313 adopted to avoid this danger; both puffback and a vertical hammer blow are effective in renewing gas-entry faces of a panel using this type of louvers. The design 313, however, is disadvantageous in two respects in a comparison with a flat-plate louver design. First, it costs more, both because it requires more metal and because it requires an extra step in fabrication, a step producing the bend seen in the drawing. Second, there is a greater loss in pressure in a gas flowing across the panel.

The left-hand drawing in FIG. 6 is a fragmentary vertical cross-section of flat-plate louvers 402, similar to the louvers 202 seen in FIG. 4. The drawing illustrates a flaw in the performance of a panel employing the louvers 402 when either puffback or a vertical hammer blow is employed for renewal of gas-entry faces 403. A face is seen to extend all the way to rear edge 404 of a superjacent louver 402, so creating an empty space, narrow in the vertical direction, between the face and the superjacent louver 402. The presence of this space, of course, prevents the use of the flat-plate louvers 402 in a panel intended to provide countercurrenticity of contacting of gas and granular material. The right-hand drawing in FIG. 6 illustrates a louver design 413 adopted to afford countercurrenticity. The design 413 is appropriate for either puffback or hammer-blow renewal of gas-entry faces. It suffers the same two disadvantages in respect to flat-plate louvers as those cited in the discussion of FIG. 5.

FIG. 7 is a schematic vertical cross-sectional drawing of a segment of a panel 501, suitable for filtering a dusty gas. In the panel 501, gas-entry-face supporting members 502 are porous and are inclined at an angle to the horizontal approaching the angle of repose of the supported granular material but shallower than this angle. A supported gas-entry face 503 is substantially parallel to a supporting member 502. Advantageously, a supporting member comprises an array of closely-spaced parallel plates, as the drawing illustrates. Distance across the granular bed 504, in a direction perpendicular to the supporting member 502, is substantially constant.

Gas entering the gas-entry face 503 flows downward in a direction substantially perpendicular to the supporting member 502, leaving the bed 504 across the member. A plate 505, lying between the supporting member 502 and the subjacent gas-entry face 503, directs gas in a direction toward the upper end of the member 502. The arrangement of FIG. 1 is appropriately employed for imparting a sharp motion of the support member 502 toward the gas-entry face 503, the motion having a dominant horizontal component. The sharp motion produces spills of granular material from the face 503.

A row of segmented, vertical pipes 506, extending in a direction perpendicular to the drawing of FIG. 7, supplies fresh granular material to the bed 504, making good losses of the material from the bed. Gas directed by the plate 505 is free to flow laterally across openings between neighboring pipes, as the open arrow seen at the right in the FIG. 7 drawing indicates. The general arrangement depicted in FIG. 7 is the filter tray disclosed in U.S. Pat. No. 7,033,556, which the instant application incorporates by reference.

While the invention has been described with reference to specific embodiments, modifications and variations of the invention may be constructed without departing from the scope of the invention, which is defined in the following claims.

I claim:

1. An improved method for renewal of a plurality of faces across which gas enters a panel of a granular material for contacting said gas and said granular material with each other to effect physical or chemical treatment of at least one of them, said gas-entry faces being transversely disposed, upwardly spaced, and held in place by supporting members, comprising:
   subjecting said supporting members to a sharp motion in a direction toward said gas-entry faces, said direction having a predominant horizontal component, said motion causing body movement of said granular material toward said faces, thereby causing moieties of granular material to fall away from said faces, said falling-away of said moieties and concomitant exposure of previously underlying granular material thereby renewing said faces.

2. The method of claim 1, wherein said supporting members are transversely disposed upwardly spaced flat-plate louvers.

3. The method of claim 2, further comprising an intermittent subjection of said louvers to said sharp motion, thereby producing an intermittent body movement of said granular material toward said faces, said intermittent body movement and flow of said gas in an opposite direction causing said contacting to be substantially countercurrent.

4. An improved method for renewal of a plurality of faces across which gas enters a panel of a granular material for substantially countercurrent contacting of said gas and said granular material with each other, said gas-entry faces being transversely disposed, upwardly spaced, and supported by flat-plate louvers, comprising:
   intermittently subjecting said louvers to a sharp motion in a direction toward said gas-entry faces, said direction having a predominant horizontal component, said motion causing an intermittent body movement of said granular material toward said faces, said intermittent body movement in one direction and flow of said gas in an opposite direction producing said substantially countercurrent contacting.

5. An improved apparatus for renewal of a plurality of faces across which gas enters a panel of a granular material for contacting said gas and said granular material with each other to effect physical or chemical treatment of at least one of them, said gas-entry faces being transversely disposed, upwardly spaced, and held in place by supporting members, comprising:
   means for subjecting said supporting members to a sharp motion in a direction toward said gas-entry faces, said direction having a predominant horizontal component, said motion causing body movement of said granular material toward said faces, thereby causing moieties of granular material to fall away from said faces, said falling-away of said moieties and concomitant exposure of previously underlying granular material thereby renewing said faces.

6. The apparatus of claim 5, wherein said supporting members are flat-plate louvers.

7. An improved apparatus for renewal of a plurality of faces across which gas enters a panel of a granular material for contacting said gas and said granular material with each other to effect physical or chemical treatment of at least one of them, said gas-entry faces being transversely disposed, upwardly spaced, and held in place by supporting members, comprising:
   means for subjecting said supporting members to a sharp motion in a direction toward said gas-entry faces, said direction having a predominant horizontal component, said motion causing body movement of said granular material toward said faces, thereby causing moieties of granular material to fall away from said faces, said falling-away of said moieties and concomitant exposure of previously underlying granular material thereby renewing said faces, wherein said means comprise:
   a pressure chamber;
   a cylinder within said chamber capable of traveling vertically;
   a first stop limiting said cylinder's upward motion at a position such that the cylinder divides said chamber into an upper region and a lower region;
   a substantially vertical rod depending from said cylinder;
   a substantially horizontal plate situated beneath said cylinder, said rod passing through a central opening in said plate, the diameter of said rod being larger below said plate than above, said plate capable of traveling vertically;
   a second stop limiting said plate's downward motion;
   electromagnetic means for causing said plate to move upward into a position where said plate serves as a bottom closure of said lower region;
   a supply of electric current to said electromagnetic means;
   a hammer head at the bottom end of said rod;
   a target beneath said hammer head;
   rod and hinge means whereby a blow of said hammer head upon said target is translated into a side thrust upon a pad situated at a central point on the gas-discharge side of said panel of granular material, thereby producing said sharp motion of said supporting members toward said gas-entry faces;
   a source of a gas at elevated pressure;
   orifice means for causing said gas to flow, first, into said lower region, second, into said upper region, and third, to an exterior of said chamber, said orifice means creating a first elevated pressure in said lower region and a second elevated pressure in said upper region, said first elevated pressure being higher than said second elevated pressure by an amount sufficient to hold said cylinder against said first stop;
   means for interrupting said electric current, allowing said gas at said first pressure to drive said plate downward against said second stop, whereby said gas in said lower region discharges suddenly to said exterior, thereby allowing said gas at said second pressure to drive said cylinder sharply downward, causing said hammer to strike said target, thereby limiting the downward motion of said cylinder; and means for renewing said electric current, thereby causing said electromagnetic means to lift said plate upward, again closing said lower region, thereby allowing said flow of said gas at elevated pressure to restore pressure levels in said lower and upper regions to said first and second elevated pressures, thereby lifting said cylinder against said first stop.

8. The apparatus of claim 7 wherein said supporting members are porous and inclined at an angle approaching the angle of repose to the horizontal of said granular material but shallower than said angle, and in which said gas-entry surfaces are substantially parallel to said porous supporting members.

9. The apparatus of claim 7, wherein said supporting members are transversely disposed upwardly spaced flat-plate louvers.

10. The apparatus of claim 7, further comprising an intermittent subjection of said louvers to said sharp motion, thereby producing an intermittent body movement of said granular material toward said faces, said intermittent body movement and flow of said gas in an opposite direction causing said contacting to be substantially countercurrent.

* * * * *